United States Patent [19]  
Edwards

[11] 3,985,552  
[45] Oct. 12, 1976

[54] SEPARATION OF PLATINUM GROUP METALS AND GOLD

[75] Inventor: Roderick Ivan Edwards, Honeydew, South Africa

[73] Assignee: National Institute for Metallurgy, Johannesburg, South Africa

[22] Filed: Aug. 1, 1975

[21] Appl. No.: 600,940

[30] Foreign Application Priority Data

Aug. 9, 1974  South Africa.....................74/5109

[52] U.S. Cl. ............ 75/101 BE; 75/118 R; 75/121; 423/22; 423/24
[51] Int. Cl.² .......................................... C22B 11/04
[58] Field of Search ............... 423/22, 24; 75/118, 75/121, 101 BE

[56] References Cited
UNITED STATES PATENTS

| 3,369,876 | 2/1968 | Grimm............................ 75/101 BE |
| 3,432,257 | 3/1969 | Spitzer................................ 423/24 |
| 3,473,921 | 10/1969 | Schmuckler............................ 75/118 |
| 3,656,939 | 4/1972 | Boehm et al....................... 75/121 X |
| 3,796,787 | 3/1974 | Burrows................................ 423/24 |
| 3,847,841 | 11/1974 | Motani et al. ..................... 423/22 X |
| 3,892,688 | 7/1975 | Motani et al. ..................... 423/22 X |

*Primary Examiner*—G. Ozaki  
*Attorney, Agent, or Firm*—Berman, Aisenberg & Platt

[57] ABSTRACT

A method of separating gold from palladium or at least one of gold and palladium from solutions containing the chloride complexes of at least the relevant ones of these metals together with other platinum group metals and wherein base metals may be present in the solution said method comprising contacting the solution for a sufficient length of time to result in extracting of substantially all the required gold and for palladium values present therein, with a suitable quantity of a water insoluble non-volatile solvent extractant in an organic phase and having functional groups of the formula $R^1$—S—R wherein $R^1$ and R may be the same or different and have a carbon atom thereof joined directly to the sulphur atom; $R^1$ and R being chosen so that neither of them have active functional groups capable of acting as ion exchangers or complexing groups and thereafter separating the two phases and recovering the extracted gold and palladium.

21 Claims, No Drawings

SEPARATION OF PLATINUM GROUP METALS AND GOLD

This invention relates to the separation of platinum group metals and gold and more particularly relates to the separation of palladium and/or gold from other platinum group and base metals and/or from each other Thioethers (sulphides) having the structure $R^1$—S—R wherein $R,R^1$ may be alkyl, aryl or aralkyl and wherein any alkyl chain may be interrupted by an oxygen atom have long been known to form complexes with the transition group metals, especially with the metals of groups: 8, 1$b$, and 2$b$.

Several complexes of the form $MX_2(RSR^1)_2$ wherein X is a halide group have been described in the literature.

The affinity of the various metals for the ($R^1$—S—R) group varies. Thus for Ag, Zn, $Cu^{II}$, etc., these metals form stronger halide complexes than thioether complexes in aqueous media. For $Cu^I$ and $Hg^{II}$ the ligand strengths are roughly equal between $Cl^-$ and R—S—R ($R,R^1$) complexes while for the platinum group metals and gold, the thioether complexes are stronger than the corresponding chlorocomplexes.

Thus one could expect that thioethers could be employed to selectively complex the PGM's and Au in chloride media in the presence of other transition elements and that a solvent extractant or ion-exchange resin could be based on a thioether functional group to extract the PGM's and Au as a group. Thus an ion exchange resin with the active group $—CH_2—S—CH_3$ was made and found to extract Pt, Pd, Au, Rh and Ir from hydrochloric acid media. Surprisingly, however, an analogous solvent extractant, di-n-octyl sulphide, was found to extract only Pd and Au from hydrochloric acid media for this group of elements, i.e. Pt, Rh, Ru, and Ir, was not extracted at all. Furthermore, it was found that, while Au was extracted extremely quickly into the organic phase, Pd was extracted very slowly. The selectivity of the solvent for Au and Pd is thus probably due to kinetic effects, since Au and Pd undergo ligand substitution reactions extremely quickly whereas the other PGM's are slow to react. Further experimentation revealed that other thioether solvent extractants of the formula $R^1$—S—R exhibited the same phenomenon.

In this specification the term "base metals" is to be interpreted as meaning any metal impurities other than platinum group metals or gold.

The invention therefore provides a method of separating at least one of gold or palladium from solutions containing the chloride complexes of at least the relevant one of these metals together with other platinum group metals and wherein base metals may be present in the solution, said method comprising contacting the solution for a sufficient length of time to result in extraction of substantially all the required gold and/or palladium present therein with a suitable quantity of water-insoluble non-volatile solvent extractant in an organic phase and having functional groups of the formula $R^1$—S—R wherein $R^1$ and R may be the same or different and have a carbon atom thereof joined directly to the sulphur atom, $R^1$ and R being chosen so that neither of them have active functional groups capable of acting as ion exchangers or complexing groups, and thereafter separating the two phases and recovering the extracted gold and/or palladium.

The invention also provides a process for separating gold and palladium from each other comprising the steps defined above wherein the contacting is effected, for a time sufficient only to enable extraction of the gold to be effected thereby leaving substantially all the palladium in the aqueous phase.

Further features of the invention provide for the recovery of gold and/or palladium from the solvent extractant to be effected by stripping with a suitable strippant solution, for the functional groups $R^1$—S—R to have R and $R^1$ meaning an alkyl, aryl or aralkyl group (and preferably a lower alkyl group) having less that 20 carbon atoms, in particular between 6 and 10; and, in the case where the starting solution contains selenium, for this metal to be either removed prior to the extraction operation, this optionally being effected by means of a precipitation step, or to be oxidized to the +4 or preferably the +6 oxidation state prior to the contacting step.

It will be understood that the invention may be applied to the removal of gold alone from starting solutions containing gold and palladium optionally together with other platinum group metals: to the removal of gold and palladium together from solutions containing other platinum group metals; or to the removal of palladium along from solutions in which gold is absent. Depending on the metal being extracted, the contact time will have to be chosen accordingly since in particular the extraction of gold from solutions containing palladium depends on the kinetics of the extraction.

The invention is particularly useful in separating gold and/or palladium from platinum and in this case the preferred extractants are di-n-octyl sulphide, decylmethyl sulphide or di-n-hexyl sulphide.

In the cases where gold is being separated from palladium the preferred extractants have a tertiary carbon atom in the α-position, such as a tertiary butyl group, as the one radical and a normal alkyl chain (for example decyl) for the other chain. These extractants emphasize the kinetic differences in behaviour between gold and palladium.

The strippants used in preferred applications of the invention are as follows:

a. Where palladium alone is stripped from the extractant, aqueous ammonia is used.

b. Where gold alone is to be stripped, a basic solution of sodium sulphite is used (pH 8)

c. Where the solvent is used to co-extract gold and palladium, a thiourea solution in 0.1M HCl is used. In this case thiourea is present in between 1 and 50 grams per liter.

In each case the extractant is soluble in an organic solvent therefor; in the experiments which have thus far been conducted an organic solvent sold under the trade mark "Solvesso" was used. Solvesso is the registered trade mark of Esso Chemicals and is applied to a commercial aromatic solvent.

The operation of the invention will become more apparent from the following description of various experiments which have thus far been conducted.

EXPERIMENT 1

This experiment was conducted simply to confirm that palladium can be extracted almost completely from an aqueous solution by means of an extractant in between 120 and 160 minutes. In this case a solution of 8250 parts per million (p.p.m.) palladium in 1M hydrochloric acid was contacted with a solution of di-n-octyl sulphide 50% in Solvesso. The contacting was effected at an organic to aqueous ratio of 1:5. The concentrations of palladium in the two phases at various times are given below in Table 1.

TABLE 1

| Contact time mins. | conc. in p.p.m. (parts per million) | |
|---|---|---|
| | aq. | org. |
| 0 | 8250 | 0 |
| 1 | 7220 | 5150 |
| 5 | 5275 | 14875 |
| 10 | 3725 | 22625 |
| 20 | 1780 | 32350 |
| 40 | 525 | 38625 |
| 80 | 29 | 41105 |
| 120 | 1 | 41245 |
| 160 | N.D. | 41250 |

EXPERIMENT 2

In experiment (2) the selective extraction of palladium from a solution containing a high concentration of platinum is shown. A plot (not shown) of palladium concentration in the aqueous phase as a function of time reveals that the palladium concentration in the aqueous phase could be reduced to substantially zero in about 130 minutes. These results also reveal that extremely high concentrations of metal can be extracted into the organic phase without the solvent becoming excessively viscous. Normal liquid extractants, such as tertiary amines, can only be used in low concentration in an inert solvent because of the viscosity problem. Thus loading of metal in the organic phase of up to 20 gpl in normal cases may be achieved, whereas the alkyl sulphides can be loaded to at least four times that concentration. Thus the amount of solvent used in this invention is very much less than in the case of normal solvent extractants.

Furthermore, it is clear that the distribution coefficient for palladium between the aqueous and organic phases ($D^o/A$) is extremely high (at least $10^5$) so that a single batch extraction can be used for efficient extraction whereas with other solvents multiple counter-current contacts are necessary. The results of this experiment are shown in Table 2 below. The extractant and solvent used were the same as those used in experiment 1 as was the aqueous to organic ratio. The starting solution was a solution of 1M hydrochloric acid containing 8625 p.p.m. palladium and 20,000 p.p.m. platinum.

Table 2

| Contact time mins | Pd aqueous p.p.m. | Pd organic p.p.m. | Pt aqueous p.p.m. |
|---|---|---|---|
| 0 | 8625 | 0 | 20000 |
| 1 | 7313 | 6560 | 20000 |
| 5 | 6000 | 13125 | 20000 |
| 10 | 3850 | 12875 | 20000 |
| 20 | 2605 | 30100 | 20000 |
| 40 | 1220 | 37025 | 20000 |
| 80 | 308 | 41585 | 20000 |

Stripping of the solvent extractant in the above and subsequent cases was accomplished using aqueous ammonia solution. For palladium, the order of increasing ligand strength appears to be $NH_3 > RSR > Cl^-$. Thus the palladium is stripped from the organic into the aqueous phase as the full tetrammine complex $Pd(NH_3)_4^{++}$. A highly concentrated strip solution can be achieved (± 120 gpl Pd). Phase separation was found to be good.

The strip solution so obtained is very suitable for subsequent processing as the palladosamine salt may be precipitated from this solution very simply by adding HCl to form $Pd(NH_3)_2 Cl_2$ which can then be calcined to yield metal.

The strip procedure may however be upset if selenium is co-extracted into the organic phase. The reason for selenium extraction is not clear but only appears to occur when palladium is extracted and when selenium is in a reduced valency state. In any event Se appears to strip into the ammonia solution as the $Se^=$ ion which immediately combines with Pd to form insoluble PdSe which creates phase separation problems. Thus selenium is preferably removed first by precipitation or oxidized as mentioned above.

The effect of varying the side chains of the active group was investigated as well. Aryl-alkyl and aryl-aryl side chains were found to be not as suitable as alkyl-alkyl sulphides for two reasons, viz, the presence of an aryl group weakened the ligand properties of the thioether considerably so that the extraction efficiency for Pd was considerably lower, i.e., the ligand strength of $R^1$—S—R and $Cl^-$ becomes more nearly equal, and the metal-ligand complexes were found to be considerably less soluble in the organic phase than in the case of the di-alkyl derivatives. Also, extraction was found to be faster from more concentrated HCl solutions.

Two different alkyl derivatives have been investigated in detail: decyl-methyl sulphide ($\Sigma C=11$) and di-n-hexyl sulphide ($\Sigma C=12$). Both proved to be better extractants than the di-n-octyl derivative as shown in experiments 3–6 below.

EXPERIMENT 3

The behaviour of decyl-methyl sulphide was tested and it appears to extract palladium at approximately three times the rate of the di-octyl sulphide while the loading obtained in the organic phase is equivalent (although the solvent was not fully loaded). No loss in selectivity was noticed, i.e., no Pt was extracted as far as could be detected. The results are given in Table 3 below. The extractant solvent was 50% decyl methyl sulphide in Solvesso, the aqueous to organic ratio 10:1, and the aqueous solution was pure platinum and palladium in 1M HCl.

TABLE 3

| | Pd | | Pt | |
|---|---|---|---|---|
| Time | aqueous p.p.m. | organic p.p.m. | aqueous p.p.m. | organic p.p.m. |
| 0 | 7969 | 0 | 10620 | 0 |
| 1 | 6406 | 15630 | 10620 | |
| 5 | 1844 | 61250 | 10620 | |
| 10 | 167 | 78020 | 10620 | |
| 20 | 94 | 78750 | 10620 | |
| 40 | N.D. | 79690 | 10620 | |
| 80 | — | — | 10620 | |
| 120 | — | — | 10620 | |
| 160 | — | — | 10620 | |

Further experiments showed the di-n-hexyl sulphide can be used with advantage. These experiments revealed that silver may be co-extracted but can be washed out to a large extent prior to stripping. Also, it appeared that the platinum which was detected in the final product palladium (of the order of 200 to 300 p.p.m.) was carried over by entrainment rather than by extraction. These experiments led to conducting of a further experiment on an actual palladium rich solution obtained from a refinery, this experiment being set out hereunder:

EXPERIMENT 4

In this experiment the use of the solvent to produce a pure palladium product from a typical platinum and metal refinery solution was tested. This solution was obtained after the following series of steps had been performed:
1. the platinum-group-metal-containing material was leached with aqua regia to produce a leach liquor containing Pt, Pd Au together with some Ru, Ir, Os and Rh and a range of base metals including Fe, Cu, Ni, Te, etc.
2. This solution was treated with ferrous sulphate to destroy the residual nitric acid and to precipitate gold, and metallic gold was removed by filtration.
3. Most of the platinum was then precipitated with ammonium chloride and filtered off.

Such a solution is now normally fed to the palladium recovery circuit. This consists, in existing plants, of the following steps:
1. Raising the pH of the solution to about nine with ammonia,
2. Re-acidifying to precipitate an impure palladium salt, and
3. Redissolving the impure salt in ammonia and re-precipitating with hydrochloric acid at least once but often several times to reduce the impurities in the salt to the required level.

In practice this series of operations is tedious and, especially when the palladium containing liquor is high in ferric ion concentration, problems are often encountered.

The actual solution used in this test had the following analysis:

| METAL | CONCENTRATION (p.p.m.) |
|---|---|
| Pd | 15700 |
| Pt | 475 |
| Ru | 315 |
| Rh | 250 |
| Ir | 220 |
| Fe | 31000 |
| Cu | 3200 |
| Ni | 2100 |
| Ag | 700 |

This solution was contacted with 25% by volume of a 50% solution of di-n-hexyl sulphide diluted with Solvesso for 2 hours. At the end of this period the phases were separated and the aqueous phase analysed for Pd which was found to have been reduced to a concentration of 10 p.p.m.

The loaded organic was then washed four times at a 1:1 organic to aqueous ratio with 0.1M HCl. Iron was removed from the loaded organic solvent in this way.

The washed organic phase, containing approximately 62,800 p.p.m. Pd, was then stripped at a 1:1 organic aqueous ratio with concentrated aqueous ammonia.

The strip solution was then precipitated in the normal manner with hydrochloric acid and the resultent salt calcined and subjected to a spectrographic analysis. The total impurities found added up to 80 p.p.m. and included:

Pt 20 p.p.m., Cu 15 p.p.m., Mg 20 p.p.m., $SiO_2$ 25 p.p.m. No Ir, Rh, Ru, Os, Au or Ag were detected and no Fe, Cu, Ni, Te or other heavy base metals were found. Thus Pd of greater than 99.99% purity was produced directly.

In normal commercial practice this purity can, at present, only be achieved with the use of a number of repeated purification steps.

From the above it will be appreciated that palladium of high purity may be obtained by the process of this invention.

Experiments conducted on the extractions of gold using alkyl sulphides have shown that not only can gold be separated from the platinum group metals other than palladium but a kinetic separation of gold from palladium may well be possible. This is due to the fact that palladium is extracted relatively slowly. However, with some solvent extractants according to the invention the extraction of palladium is so fast that back extraction of the gold commences too quickly to enable phase separation to be effected at the required time. Other solvent extractants do, however, behave in a manner enabling phase separation to be effected at the desired time.

The reason for the very fast extraction of gold as opposed to the slow extraction of palladium is believed to be that gold is extracted by a single ligand exchange reaction whereas for palladium two chloride ligands have to be exchanged for thioether groups before extraction takes place.

Various experiments were conducted to ascertain the possibilities of separating gold and palladium using the kinetic difference in behaviour outlined above as well as one set of experiments to determine the distribution coefficient of gold for such an extractant. These experiments are described below:

EXPERIMENT 5

The distribution coefficient for $Au^{III}$ between 1M HCl and 50% v/v di-n-hexyl sulphide by volume in Solvesso was measured at three different aqueous/organic ratios. At the highest aqueous/organic ratio used, the organic phase became denser than the aqueous phase when loaded. As this phase inversion could cause problems in practice, higher ratios were not investigated and thus the maximum capacity of the solvent could not be determined. The results obtained are shown in Table 4 below:

TABLE 4

| Aqueous Conc. p.p.m. Au | Aqueous/Organic Ratio | Conc. in Organic Phase p.p.m. | Distribution Coeff $D^o/a$ |
|---|---|---|---|
| Head = 50,000 | — | — | — |
| .08 | 1:1 | 50,000 | $6 \times 10^5$ |
| 2.8 | 2:1 | 100,000 | $3.6 \times 10^4$ |
| 4.6 | 3:1 | 150,000 | $3.3 \times 10^4$ |

Thus the highest organic concentration obtained (150 gpl) is approximately 50% of the theoretical capacity which is 320 gpl.

EXPERIMENT 6

Table 5 illustrates the simultaneous extraction of Au and Pd into di-n-hexyl sulphide (a 5% solution in Solvesso). These results show that, initially, Au is extracted preferentially to Pd, but, that after a short time, Pd begins to be extracted, and that eventually, the Au is back-extracted into the aqueous phase. The lowest Au concentration in the aqueous phase occurs approximately after 60 seconds extraction time. This is too short a period of time to allow for successful phase separation.

Loading of Au into 5% di-n-hexyl sulphide in Solvesso 150 at a 3:1 aqueous/organic ratio out of a mixed Au/Pd solution in 1M HCl is shown in Table 5.

TABLE 5.

|    | Time (mins) | Aqueous ppm | Aqueous mg | Organic mg | Organic ppm | Distribution Coefficient D°/a |
|----|-------------|-------------|------------|------------|-------------|-------------------------------|
| Au | 0           | 9875        | 246.88     | 0          | 0           | 0                             |
|    | 1           | 65          | 1.63       | 245.25     | 29909       | 460.14                        |
|    | 2           | 78          | 1.95       | 244.93     | 29870       | 382.94                        |
|    | 5           | 1050        | 26.25      | 220.63     | 26906       | 25.62                         |
|    | 10          | 2350        | 58.75      | 188.13     | 22943       | 9.76                          |
|    | 20          | 4063        | 101.58     | 145.30     | 17720       | 4.36                          |
|    | 40          | 6563        | 164.08     | 82.80      | 10098       | 1.54                          |
| Pd | 0           | 25781       | 644.53     | 0          | 0           | 0                             |
|    | 1           | 25390       | 634.75     | 9.78       | 1193        | 0.05                          |
|    | 2           | 23594       | 589.85     | 54.68      | 6668        | 0.28                          |
|    | 5           | 23313       | 582.83     | 61.70      | 7524        | 0.32                          |
|    | 10          | 22781       | 569.53     | 75.00      | 9146        | 0.40                          |
|    | 20          | 22500       | 562.50     | 82.03      | 10004       | 0.44                          |
|    | 40          | 21953       | 548.83     | 95.70      | 11671       | 0.53                          |

EXPERIMENT 7

Table 6 illustrates a similar experiment utilising di-n-octyl sulphide as the extractant. In this case, the lowest Au concentration is achieved after approximately 120 seconds and Pd is less effective in promoting the re-extraction of Au from the organic phase.

Table 6

Loading of Au into 5% di-n-octyl sulphide at a ratio of a 1:2.5 O:A out of a mixed Pd/Au solution in 1M HCl

|    | Time (Mins) | Aqueous Phase ppm | Aqueous Phase mg | Organic Phase mg | Organic Phase ppm | Distribution Coefficient D°/A |
|----|-------------|-------------------|------------------|------------------|-------------------|-------------------------------|
| Au | 0           | 9875              | 246.88           | 0                | 0                 | 0                             |
|    | 1           | 1063              | 26.58            | 220.30           | 20981             | 19.74                         |
|    | 2           | 19                | 0.48             | 246.40           | 23467             | 1235.11                       |
|    | 5           | 375               | 9.38             | 237.50           | 22619             | 60.32                         |
|    | 10          | 1200              | 30.00            | 216.88           | 20655             | 17.31                         |
|    | 20          | 2422              | 60.55            | 186.33           | 17746             | 7.33                          |
|    | 40          | 4688              | 117.2            | 129.68           | 12350             | 2.63                          |
| Pd | 0           | 25781             | 644.53           | 0                | 0                 | 0                             |
|    | 1           | 25781             | 644.53           | 0                | 0                 | 0                             |
|    | 2           | 24313             | 607.83           | 36.70            | 3495              | 0.14                          |
|    | 5           | 23906             | 597.65           | 46.88            | 4465              | 0.19                          |
|    | 10          | 23313             | 582.83           | 61.70            | 5876              | 0.25                          |
|    | 20          | 22500             | 562.50           | 82.03            | 7812              | 0.35                          |
|    | 40          | 22188             | 554.70           | 89.83            | 8555              | 0.39                          |

EXPERIMENT 8

Tables 7, 8 and 9 show further experiments employing an alkyl sulphide with a highly branched chain at one side (octyl-tertiary butyl sulphide).

Tables 7 and 8 show separately that the extraction of both Pd and Au are considerably slower than when straight-chain alkyl sulphides are employed. The difference in kinetics is however increased.

Table 9 shows that, when the extraction takes place from a mixed Au/Pd solution, no re-extraction of the Au is experienced after 10 minutes of extraction, and that extraction of Pd is low. The apparent extraction of Pd during the course of the experiment is probably due to analytical error as the final barren figure as well as the strip figures show effectively no Pd extraction.

TABLE 7

Loading of Pd into 5% tertiary-butyl-decyl sulphide in Solvesso 150 A:O = 25:4.7 out of a Pd solution in 1M HCl.

|    | Time (Mins) | Aqueous ppm | Aqueous mg | Organic mg | Organic ppm | Distribution Coefficient D°/A |
|----|-------------|-------------|------------|------------|-------------|-------------------------------|
| Pd | 0           | 11100       | 277.5      | 0          | 0           | 0                             |
|    | 1           | 10740       | 268.5      | 9          | 1923        | 0.179                         |
|    | 2           | 10690       | 267.3      | 10.2       | 2190        | 0.205                         |
|    | 5           | 10500       | 262.5      | 15.0       | 3205        | 0.305                         |
|    | 10          | 9600        | 240.0      | 37.5       | 8013        | 0.835                         |
|    | 20          | 9050        | 226.3      | 51.2       | 10951       | 1.210                         |
|    | 40          | 8450        | 211.3      | 66.2       | 14156       | 1.675                         |
|    | 80          | 9050        | 226.3      | 51.2       | 10951       | 1.210                         |

TABLE 8

Loading of Au into 5% tertiary butyl-decyl sulphide in Solvesso 150 A:O = 25:4.7 out of a synthetic Au solution in IM HCl.

|    | Time (Mins) | Aqueous ppm | Aqueous mg | Organic mg | Organic ppm | Distribution Coefficient $D^o/A$ |
|----|---|---|---|---|---|---|
| Au | 0  | 2230 | 55.75 | 0     | 0     | 0       |
|    | 1  | 1560 | 39.00 | 16.75 | 3579  | 2.294   |
|    | 2  | 990  | 24.75 | 31.00 | 6624  | 6.691   |
|    | 5  | 48   | 1.2   | 54.55 | 11656 | 242.83  |
|    | 10 | 5.2  | 0.13  | 55.62 | 11884 | 2285.50 |

TABLE 9

Loading of Au into 5% tertiary-butyl decyl sulphide in Solvesso 150 A:O 5:1 out of a Pd/Au solution in 1M HCl.

|    | Time (Mins) | Aqueous ppm | Aqueous mg | Organic mg | Organic ppm | Distribution Coefficient $D^o/A$ |
|----|---|---|---|---|---|---|
| Au | 0      | 2230  | 55.75  | 0     | 0     | 0      |
|    | 1      | 1640  | 41.    | 14.75 | 3152  | 1.922  |
|    | 2      | 930   | 23.25  | 32.5  | 6944  | 7.467  |
|    | 5      | 26    | 0.65   | 55.1  | 11774 | 452.83 |
|    | 10     | 31    | 0.78   | 54.98 | 11747 | 378.93 |
|    | Barren | 19.4  | 0.49   | 55.27 | 11809 | 608.70 |
|    | Wash   | 1.5   | 0.015  |       |       |        |
|    | Strip  | 5520  | 55.2   |       |       |        |
| Pd | 0      | 13320 | 333.0  | 0     | 0     | 0      |
|    | 1      | 13230 | 330.75 | 2.25  | 481   | 0.036  |
|    | 2      | 13000 | 325.   | 8.    | 1709  | 0.131  |
|    | 5      | 12950 | 323.75 | 9.25  | 1976  | 0.153  |
|    | 10     | 12830 | 320.75 | 12.25 | 2618  | 0.204  |
|    | Barren | 13400 | 335.0  | 0     | 0     | 0      |
|    | Wash   | 77    | 0.77   |       |       |        |
|    | Strip  | 47    | 0.47   |       |       |        |

It will be appreciated that by the adoption of suitable process steps the invention may be used to separate gold and palladium from each other to a generally satisfactory degree and that the type of process steps employed will depend to a large extent on the particular sulphide used as the extractant.

What I claim as new and desire to secure by Letters Patent is:

1. A method of separating at least one of gold and palladium from solutions containing the chloride complexes of at least the relevant one of these metals together with other platinum group metals and wherein base metals may be present in the solution said method comprising contacting the solution for a sufficient length of time to result in extraction of substantially all the required gold and palladium values present therein, with a suitable quantity of a water-insoluble non-volatile solvent extractant in an organic phase having functional groups of the formula $R^1$—S—R wherein $R^1$ and R may be the same or different and have a carbon atom thereof joined directly to the sulphur atom; $R^1$ and R being chosen so that neither of them have active functional groups capable of acting as ion exchangers or complexing groups and thereafter separating the two phases and recovering the extracted gold and palladium.

2. A process as claimed in claim 1 in which both gold and palladium are co-extracted from a solution containing other platinum group metals and optionally base metals.

3. A method as claimed in claim 2 in which adsorbed gold and palladium are recovered from the extractant by stripping with an acidic solution of thiourea.

4. A process as claimed in claim 1 in which gold is substantially absent from said solution and palladium alone is extracted.

5. A method as claimed in claim 4 in which adsorbed palladium is recovered from the extractant by stripping with aqueous ammonia solution.

6. A method as claimed in claim 5 in which metallic palladium is produced by precipitating from the strip solution, a tetra-ammine complex of palladium and calcining the precipitate.

7. A process as claimed in claim 1 in which platinum is present in the solution.

8. A method as claimed in claim 1 in which adsorbed gold and/or palladium is recovered by stripping the extractant.

9. A method as claimed in claim 1 in which R and $R^1$ are independently of each other, each aryl, alkyl or aralkyl with not more than 20 carbon atoms in each case.

10. A method as claimed in claim 1 in which R and $R^1$ are both alkyl with not more than 20 carbon atoms in each case.

11. A method as claimed in claim 10 in which the extractant is di-n-decyl-sulphide, di-n-hexyl sulphide or methyl-n-decyl sulphide.

12. A method as claimed in claim 1 in which the loaded extractant is washed prior to recovery of the gold and palladium.

13. A method as claimed in claim 12 in which washing is effected using dilute HCl solution.

14. A method as claimed in claim 1 in which the extractant is an organic solvent comprising a diluent and an active thioether as defined.

15. A method as claimed in claim 1 in which selenium is present in the initial solution and is either removed prior to contacting or is oxidized to $Se^{+4}$, but preferably to $Se^{+6}$.

16. A method of separating gold and palladium from each other in which the two metals are present in a solution in the form of their chloride complexes, said method comprising contacting the solution for a sufficient length of time to result in the extraction of substantially all the gold present therein, with a suitable quantity of a water-insoluble non-volatile solvent extractant in an organic phase and having functional groups of the formula $R^1$—S—R wherein $R^1$ and R may be the same or different and have a carbon atom thereof joined directly to the sulphur atom $R^1$ and R being chosen so that neither of them have active functional groups capable of acting as ion exchangers or complexing groups and thereafter separating the two phases and recovering the extracted gold.

17. A method as claimed in claim 16 in which adsorbed gold is recovered by stripping the extractant.

18. A method as claimed in claim 16 in which the adsorbed gold is recovered by stripping the extractant with a basic solution of sodium sulphite.

19. A method as claimed in claim 6 in which either R or $R^1$ is a branched alkyl radical having a tertiary carbon atom in the a-position.

20. A method as claimed in claim 19 in which R and $R^1$ represent, respectively, tertiary-butyl and a straight-chain alkyl group, preferably decyl.

21. A method as claimed in claim 16 in which the loaded extractant is washed prior to recovery of the gold.

\* \* \* \* \*

UNITED STATES PATENT OFFICE
CERTIFICATE OF CORRECTION

Patent No. 3,985,552      Dated October 12, 1976

Inventor(s) Roderick Ivan Edwards

It is certified that error appears in the above-identified patent and that said Letters Patent are hereby corrected as shown below:

Column 1, line 19, "$Cu^{11}$" should read --$Cu^{II}$--; line 21, "$Cu^1$ and $Hg^{11}$" should read --$Cu^I$ and $Hg^{II}$--; line 22, "R—S—R" should read --$R-S-R^1$--; line 23, "$R,R^1$" should read --R, $R^1$ alkyl--; column 2, line 5, "effected" should read --effected,--. Column 3, line 46, "1" should read --1,--. Column 4, line 19, "reasons" should read --reasons:--. Column 5, line 12, "Pd Au" should read --Pd and Au--. Column 6, line 2, "resultent" should read --resultant--; line 6, "$SiO_2$" should read --and $SiO_2$--; line 44, "$Au^{111}$" should read --$Au^{III}$--.

Column 10, line 38, "solution," should read --solution--; . Column 12, line 6, "claim 6" should read --claim 16--; line 8, "a-position" should read --α-position--.

Signed and Sealed this nineteenth Day of July 1977

[SEAL]

Attest:

RUTH C. MASON
Attesting Officer

C. MARSHALL DANN
Commissioner of Patents and Trademarks